US006349210B1

United States Patent
Li

(10) Patent No.: US 6,349,210 B1
(45) Date of Patent: Feb. 19, 2002

(54) METHOD AND APPARATUS FOR BROADCASTING MESSAGES IN CHANNEL RESERVATION COMMUNICATION SYSTEMS

(75) Inventor: Chris Cho-Pin Li, New York, NY (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 09/704,711

(22) Filed: Nov. 3, 2000

Related U.S. Application Data
(60) Provisional application No. 60/164,956, filed on Nov. 12, 1999.

(51) Int. Cl.[7] .................................................. H04Q 7/20
(52) U.S. Cl. ....................... 455/450; 455/464; 455/509; 370/329
(58) Field of Search ................................ 455/517, 412, 455/434, 497, 450, 464, 466, 509, 511, 515, 452, 502, 503; 370/341, 329

(56) References Cited

U.S. PATENT DOCUMENTS

| 4,958,343 A | 9/1990 | Abramovici et al. |
| 5,068,916 A | 11/1991 | Harrison et al. |
| 5,231,634 A | 7/1993 | Giles et al. |

(List continued on next page.)

FOREIGN PATENT DOCUMENTS

| DE | 41069741 A1 | 9/1992 |
| JP | 06121373 | 4/1994 |
| JP | 08125654 | 5/1996 |
| JP | 09200850 | 7/1997 |
| JP | 09205668 | 8/1997 |
| JP | 11032373 | 2/1999 |
| WO | WO 09718637 | 5/1997 |

OTHER PUBLICATIONS

Lin, C.R. et al, "Real–time support in multihop wireless networks", Wireless Networks 5 (1999), pp. 125–135.

Koubias, S.A. et al, "Further results on the performance . . . ATP–2 for local area networks", IEEE Transactions on Computers, vol. V37, No. 3, 1988, pp. 376–383.

Bandai, M. et al., "Performance analysis of a channel reservation . . . unicast and multicast packets", Trans. Inst. Electron. Inf. Comm. Eng. B–I, Japan, vol. J82B–1, No. 2, Feb. 1999, pp. 236–250.

Riera, M.O.I. et al, "Variable channel reservation . . . mobility platforms", VTC '98, 48th IEEE Vehicular Technology Conference, 1998, pp. 1259–1263.

Kee, Chaing Chua et al, "Probabilistic channel reservation . . . pico/microcellular networks", IEEE Commun. Lett. (USA), vol. 2, No. 7, Jul. 1998, pp. 195–196.

(List continued on next page.)

Primary Examiner—William Trost
Assistant Examiner—Congvan Tran

(57) ABSTRACT

A method and apparatus for broadcasting messages in accordance with the present invention transmits a broadcast message within a wireless communication system or network utilization of redundant Request-to-Send type or broadcast notice messages or packets BRTS). A source node repeatedly transmits a sequence of these messages over a system reservation channel with each message containing a sequence identifier. The sequence identifier of each succeeding message has a value immediately preceding the identifier of the previously transmitted broadcast notice message. A destination node receives the messages and determines the transmission time of the broadcast message based on each received message identifier. Subsequent transmission and reception of the final broadcast notice message in the sequence, the broadcast message is transmitted by the source node to the destination node over a data channel identified in the transmitted messages. The quantity of broadcast notice messages may be dynamically adjusted to maintain system performance at a desired level.

32 Claims, 10 Drawing Sheets

U.S. PATENT DOCUMENTS

| | | | |
|---|---|---|---|
| 5,233,604 A | | 8/1993 | Ahmedi et al. |
| 5,317,566 A | | 5/1994 | Joshi |
| 5,530,912 A | | 6/1996 | Agrawal et al. |
| 5,535,195 A | | 7/1996 | Lee |
| 5,631,897 A | | 5/1997 | Pacheco et al. |
| 5,684,794 A | * | 11/1997 | Lopez et al. ................ 370/337 |
| 5,687,168 A | | 11/1997 | Iwata |
| 5,745,694 A | | 4/1998 | Egawa et al. |
| 5,805,593 A | | 9/1998 | Busche |
| 5,805,977 A | * | 9/1998 | Hill et al. .................. 455/31.3 |
| 5,805,995 A | | 9/1998 | Jiang et al. |
| 5,825,772 A | | 10/1998 | Dobbins et al. |
| 5,881,095 A | * | 3/1999 | Cadd .......................... 375/202 |
| 5,896,561 A | * | 4/1999 | Schrader et al. ........... 455/67.1 |
| 5,903,559 A | | 5/1999 | Acharya et al. |
| 5,909,651 A | * | 6/1999 | Chandler et al. ........... 455/466 |
| 5,241,542 A | * | 8/1999 | Natarajan et al. .......... 370/95.3 |
| 6,052,594 A | * | 4/2000 | Chuang et al. ............. 455/450 |
| 6,130,881 A | | 10/2000 | Stiller et al. |
| 6,192,053 B1 | | 2/2001 | Angelico et al. |
| 6,208,870 B1 | * | 3/2001 | Lorello et al. .............. 455/466 |
| 6,246,875 B1 | * | 6/2001 | Seazholtz ................... 455/432 |

OTHER PUBLICATIONS

Tripathi, S.B. et al., "Performance analysis of microcellisation . . . cellular wireless networks", 1997 IEEE Inter. Conf. On Personal Wireless Communications, pp. 9–14.

Boumerdassi, S., "A new channel reservation . . . cellular communication systems", Broadband Communications, Fourth Intern. Conf. On Broadband Commun., 1998, pp. 157–168.

Wei, Huang et al, "Channel reservation for high rate service in cellular networks", 1997 IEEE Pacific Rim Conference, vol. 1, pp. 350–353.

Konishi, S. et al, "Flexible transmission bandwidth . . . for NGSO MSS networks", IEEE J. Sel. Areas Commun. (USA), vol. 15, No. 7, Sep. 1997, pp. 1197–1207.

Ohta, C., et al, "Effects of moving mobiles . . . micro–cellular systems", IEEE Globecom 1996, vol. 1, 1996, pp. 535–539.

Kanazawa, A. et al, "Performance study of . . . micro–cellular systems", IEICE Trans. Fundam. Electron. Commun. Comput. Sci. (Japan), vol. E79–A, No. 7, Jul. 1996, p. 990–6.

Harms. J.J. et al, "Performance modeling of a channel reservation service", Comput. Netw. ISDN Syst. (Netherlands), vol. 27, No. 11, Oct. 1995, pp. 1487–1497.

Harms, J.J. et al, "Performance of scheduling algorithms for channel reservation", IEE Proc., Comput. Digit. Tech. (UK), vol. 141, No. 6, Nov. 1994, pp. 341–346.

Barghi, H. et al, "Time constrained performance . . . for loal network", Eleventh Annual International Phoenix Conference on Computers and Communications, 1992, pp. 644–650.

Masuda, E., "Traffic evaluation of . . . on a T–S–T network", Electron. Commun. Jpn. 1, Commun. (USA), vol. 72, No. 8, Aug. 1989, pp. 104–119.

"PacTel Withdraws . . . dialtone operations", Multichannel News Jan. 29, 1996, pp. 48.

Iwata et al, "Scalabe Routing . . . Wireless Networks", IEEE Journal on Selected Areas in Communications, vol. 17, No. 8, Aug. 1999, pp. 1369–1379.

Joa–Ng, et al, "A Peer–to–Peer . . . Mobile Ad Hoc Networks", IEEE Journal on Selected Areas in Communications, vol. 17, No. 8, Aug. 1999, pp. 1415–1425.

Das et al, "Routing in ad hoc networks using a spine", Proceedings of $6^{th}$ Intern. Conf. On Computer Commun. And Networks, Las Vegas, 1997, pp. 34–39.

Krishna et al, "A cluster–based approach for routing in ad–hoc networks", Proceedings of the Second USENIX Symposium on Mobile and Location—Independent Computing, 1995, pp. 1–10.

Baker D.J. et al, "The architectural organization of a mobile radio network via a distributed algorithm", IEEE Trans. Commun., vol. Com–29, No. 11, pp. 1694–1701, Nov. 1981.

Baker, D.J. et al, "A distributed algorithm . . . mobile radio network", in Proc. IEEE ICC'82, pp. 2F.6.1–2F.6.5.

Ephremides, A. et al., "A design Concept . . . hopping signaling", Proc. IEEE, vol. 75, No. 1, Jan. 1987, pp. 56–73.

Gerla M. et al, "Multicluster, mobile, multimedia radio network", Baltzer Journals, Jul. 12, 1995, pp. 1–25.

Lin, C.R. et al, "Adaptive clustering for mobile wireless network", IEEE JSAC, Sep. 1997, pp. 1–21.

MingLiang et al, "Cluster Based Routing Protocol (CBRP) Functional Specification" Internet–Draft, Aug. 14, 1998.

Moy, J., "OSPF version 2", RFC2328, Apr. 1998.

Kweon, Seok–Kyo, Real–Time . . . Packet Networks (Quality of Service, ATM, Ethernet), 1998, pp. 1–158.

Huang, Yih, Group Communication Under Link–State Routing (Multipoint Communications, Leader Election), 1998, pp. 1–204.

Behrens, Jochen, Distributed Routing For Very Large Networks Based on Link Vectors (Routing Algorithm), 1997, pp. 1–109.

Khosravi–Sichani, et al, Performance Modeling and Analysis of the Survivable Signaling Networks, Proceedings—IEEE Military Communications Conference, v 3, 1991, pp. 880–4.

Bellur, et al, "A Reliable, Efficienct Topology . . . Dynamic Networks", IEEE Infocom '99, Conf. On Computer Commun. Proceed. $18^{th}$ Annual Joint Conf. Of IEEE Comp. And Commun. Societies, vol. 1, 1999, pp. 178–186.

Ching–Chuan, et al, "On–Demand Multicast in Mobile Wireless Networks", Proceed. $6^{t}$ Intern. Conf. On Network Protocols, 1998, pp. 262–270.

Garcia–Luna–Aceves, et al, "Scalable Link–State Internet Routing", Proceed. $6^{th}$ Intern. Conf. On Network Protocols, 1998, pp. 52–61.

Huang et al, "Optimal Switch–Aided Flooding Operations in ATM Networks", 1998 IEEE ATM Workshop Proceedings, 1998, pp. 329–338.

Behrens, et al, "Optimal Switch–Aided Flooding Operations in ATM Networks", 1998 IEEE ATM Workshop Proceedings, 1998, pp. 329–338.

Garcia–Luna–Aceves, et al, "Distributed, Scalable Routing . . . States", IEEE J. Sel. Areas Commun. (USA), vol. 13, No. 8, Oct. 1995, pp. 1383–1395.

Behrens, et al, "Distributed, Scalable Routing Based on Link–State Vectors", Comput. Commun. Rev. (USA), vol. 24, No. 4, Oct. 1994, pp. 136–147.

Rutenburg et al, "How to Extract Maximum . . . Topology Updates", IEEE Infocom '93, Conf. On Comp. Commun. Proceed. $12^{th}$ Annual Joint Conf. Of the IEEE Comp. And Commun. Societies, 1993, pp. 1004–1013.

Garcia–Luna–Aceves, "Reliable Broadcast of Routing Information Using Diffusing Computations", Globecom '92, Communication for Global Users, IEEE Global Tel. Conf., 1992, pp. 615–621.

Moy, J., "OSPF Version 2", RFC 1583, Mar. 1994.

Johnson et al, "Dynamic Source Routing in Ad Hoc Wireless Networks", Mobile Computing, 1996.

Broch et al, "The Dynamic Source Routing Protocol for Mobile Ad Hock Networks", IETF internet draft, Mar. 13, 1998.

Broch et al, "The Dynamic Source Routing Protocol for Mobile Ad Hock Networks", IETF internet draft, Oct. 22, 1999.

Johnson et al, "The Dynamic Source Routing Protocol for Mobile Ad Hock Networks", IETF internet draft, Nov. 17, 2000.

Park et al, "Temporally–Ordered Routing Algorithm (TORA) version 1", IETF internet draft, Aug. 7, 1998.

Park et al, "Temporally–Ordered Routing Algorithm (TORA) version 1", IETF internet draft, Oct. 22, 1999.

Park et al, "Temporally–Ordered Routing Algorithm (TORA) version 1", IETF internet draft, Nov. 24, 2000.

Perkins, "Ad Hoc On Demand Distance Vector (AODV) Routing", IETF Internet draft, Nov. 20, 1997.

Perkins, "Ad Hoc On Demand Distance Vector (AODV) Routing", IETF Internet draft, Nov. 24, 2000.

Deering et al, "Protocol Independent Multicast Version2, Dense Mode Specification", IETF internet draft, May 21, 1997.

Garcia–Luna_Aceves, "Source Tree Adaptive Routing (STAR) Protocol", IETF Draft, Oct. 1999.

Wu et al, "Ad Hoc Multicast Routing Protocol Utilizing Increasing id–numbers (AMRIS)", IETF internet draft, 1998.

Ballardie, "Core Based Tree Multicast Routing", RFC 2186, Sep. 1997.

Ballardie et al, "Core Based Tree (CBT)", SIGCOMM '93, 1993, pp. 86–94.

Chiang et al, "Shared Tree Wireless Network Multicast", IC3N'97, Apr. 1997, pp. 1–16.

Chiang et al, "Forwarding Group Multicast Protocol (FGMP) for Multihop", Mobile Wireless Networks, ACM–Baltzer Journal of Cluster Computing, 1998.

Lee et al, "On–Demand Multicast Routing Protocol (ODMRP) for Ad Hoc Networks", IETF internet draft, Jan. 2000.

North et al, "Wireless Networked Radios: Comparison of Military, Commercial and R&D Protocols", Second Annual UCSD Conference on Wireless Communications, Mar. 3, 1999, pp. 1–6.

\* cited by examiner

METHOD AND APPARATUS FOR BROADCASTING MESSAGES IN CHANNEL RESERVATION COMMUNICATION SYSTEMS

CROSS-REFERENCE TO RELATED APPLICATIONS

This application claims priority from U.S. Provisional Patent Application Serial No. 60/164,956, entitled "Broadcast Method in Channel Reservation System and Apparatus" and filed Nov. 12, 1999. The disclosure of that provisional application is incorporated herein by reference in its entirety.

BACKGROUND OF THE INVENTION

1. Technical Field

The present invention pertains to communication systems. In particular, the present invention pertains to a channel reservation communication system employing reliable transmission of broadcast messages (e.g., messages transmitted from a system source node to plural destination nodes within the system).

2. Discussion of Related Art

Generally, wireless communication systems or networks employ radio channels that are shared by each radio node within a system. However, simultaneous transmission of messages by radio nodes over the same radio channel produces collisions that degrade system performance. These collisions basically prevent reception of messages by the nodes, thereby causing the messages to be dropped and/or re-transmitted. Various conventional channel access schemes or protocols may be employed by a communication system to reduce the occurrence of collisions, such as Carrier Sense Multiple Access with Collision Avoidance (CSMA/CA), Time Division Multiple Access (TDMA) and channel reservation.

With respect to channel reservation, these types of schemes are typically employed by wireless communication systems to enhance reliability of packet transmissions. Basically, channel reservation schemes utilize one or more channels for transferring data and an additional independent channel for transference of reservation control information (e.g., information to reserve a data channel for transference of the data), and typically conduct a two-way handshake to initiate the data transference. In particular, a source node communications device, such as a modem, initially reserves a data channel for transmission of a data packet in response to the data packet being received from a succeeding layer of a communications protocol employed by the system. Communications protocols typically include hierarchical layers with each layer having a specific function that, in combination, receive, process and transmit messages. The layer functions may range from packet generation and processing to physical or hardware functions of facilitating communications across the network. Channel reservation is accomplished by the source node transmitting a Request-to-Send (RTS) packet to an intended destination node over the reservation channel in response to detecting available data channel space. The RTS packet generally includes information that informs the destination node of a pending data packet and permits the destination node to determine the presence of sufficient available data channel space for the source node to transmit that packet. If the destination node detects sufficient available channel space for transmission of the pending data packet, a Clear-to-Send (CTS) packet is transmitted over the reservation channel from the destination node to the source node and includes appropriate information to enable reservation of the data channel space for transmission of the data packet. Once the source node receives the CTS packet, the data packet is transmitted from the source node to the destination node over the reserved data channel space. Since the destination node determines appropriate conditions for transmission of data packets, the probability of collisions due to "hidden terminals" (e.g., nodes that simultaneously transmit messages to a common destination node without being aware of the other transmissions, thereby causing collisions at the common destination node) is minimized.

The channel reservation technique described above typically enhances communications for point-to-point messages (e.g., messages that are directed from a source node to one specific destination node). However, with respect to transmission of broadcast messages (e.g., messages transferred from one source node to plural destination nodes), this technique suffers from several disadvantages. In particular, the identities of intended destination nodes for a broadcast message are typically unknown to a source node (e.g., at the physical layer of the communications protocol where messages are transferred onto the network), thereby imposing a substantial barrier for addressing and transmitting RTS packets to different destination nodes. Further, even if destination nodes for a broadcast message are identified by a source node, a substantial quantity of CTS messages are sent by the destination nodes over the reservation channel in response to receiving an RTS packet, thereby causing collisions in the reservation channel and reducing the success rate of reserving suitable data channel space.

Since broadcast messages cannot be efficiently transmitted utilizing conventional channel reservation schemes as described above, different techniques may be more suitable for handling those types of messages. For example, one approach may include transmitting the broadcast message via a modified channel reservation scheme. In particular, a source node initially transmits an RTS message over a reservation channel to all nodes within the source node transmission range. Once the RTS message is received, the destination nodes wait for transmission of the broadcast message over a data channel identified in the RTS packet, while the source node waits for expiration of a predetermined time interval. When the time interval expires, the source node transmits the broadcast message over the identified data channel.

The above-described techniques suffer from several disadvantages. In particular, the techniques described above generally do not provide reliable broadcast communications and adversely affect channel conditions. Since channel space for transmission of broadcast messages cannot be securely reserved, transmission of these messages causes collisions in the data channel when there is transmission of other data packets. Although collisions within the data channel are infrequent when employing the channel reservation techniques described above with a low or light traffic load, the frequency of collisions with these techniques increases with heavier traffic loads, thereby causing re-transmission of point-to-point messages and congestion of the data channels. Thus, performance of the above-described techniques depends upon the condition of the reservation and data channels. In other words, these techniques enhance communications when channel use is low, but have poor performance and degrade channel conditions when the channels are heavily utilized or congested.

OBJECTS AND SUMMARY OF THE INVENTION

Accordingly, it is an object of the present invention to broadcast messages within a communications system while minimizing performance degradation due to increased system traffic.

It is another object of the present invention to enhance reliability of broadcast transmissions within a communication system and maintain system performance at a desired level.

Yet another object of the present invention is to utilize redundant Request-to-Send type messages (BRTS) in a communication system to ensure reliability of broadcast transmissions.

Still another object of the present invention is to dynamically adjust the quantity of RTS type messages (BRTS) transmitted within a communication system to enhance reliability of broadcast transmissions and control system performance.

The aforesaid objects may be achieved individually and/or in combination, and it is not intended that the present invention be construed as requiring two or more of the objects to be combined unless expressly required by the claims attached hereto.

According to the present invention, a broadcast message is transmitted within a wireless communication system or network via utilization of redundant Request-to-Send type or broadcast notice messages or packets (BRTS). A source node repeatedly transmits a sequence of these messages over a system reservation channel with each message containing a sequence identifier. The sequence identifier of each succeeding message has a value immediately preceding the identifier of the previously transmitted broadcast notice message. A destination node receives the messages and determines the transmission time of the broadcast message based on each received message identifier. Subsequent transmission and reception of the final broadcast notice message in the sequence, the broadcast message is transmitted by the source node to the destination node over a data channel identified in the transmitted messages. The quantity of broadcast notice messages may be dynamically adjusted to maintain system performance at a desired level.

The present invention achieves a greater success rate for transmission of broadcast messages than conventional techniques that provide limited channel reservation capability, and has a system performance that degrades gracefully and to a lesser degree than those techniques as the channels become congested. Further, the present invention achieves greater transmission reliability, and by dynamically controlling parameters or the quantity of the broadcast notice messages employed, provides a manner in which to maintain a pre-defined success rate under dynamically changing conditions. In other words, transmission performance of the present invention may be maintained as channels become congested by dynamically adjusting parameters. The present invention basically utilizes redundant broadcast notice messages to ensure broadcast transmission reliability, thereby enhancing transmission performance and reducing reservation channel capacity. Since utilization of the reservation channel is generally low, increase in reservation channel traffic due to the redundant broadcast notice messages has a limited impact on the reservation channel.

The above and still further objects, features and advantages of the present invention will become apparent upon consideration of the following detailed description of specific embodiments thereof, particularly when taken in conjunction with the accompanying drawings, wherein like reference numerals in the various figures are utilized to designate like components.

DETAILED DESCRIPTION OF THE PREFERRED EMBODIMENTS

Figure 1:
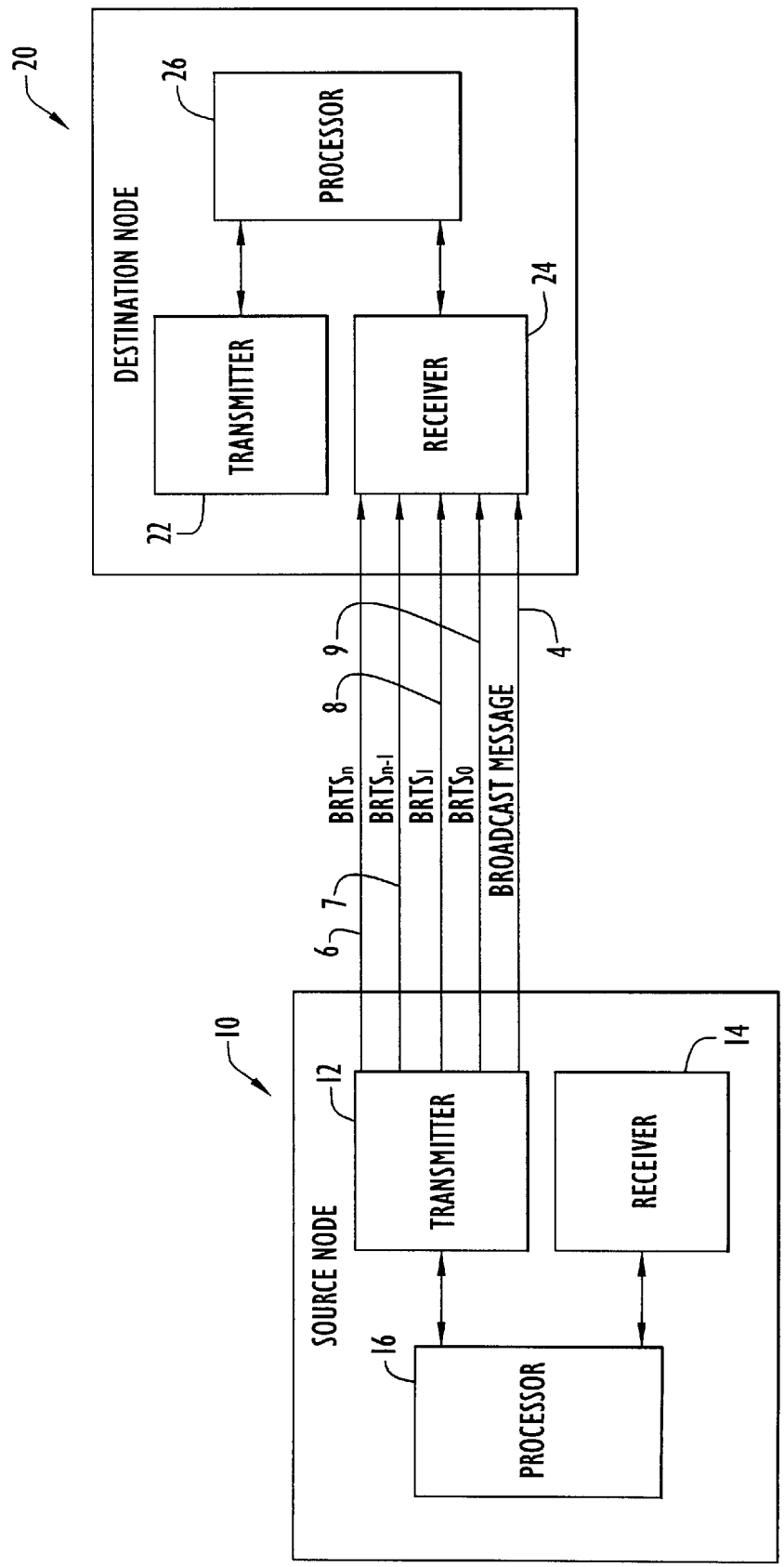
FIG. 1 is a block diagram of network nodes transmitting and receiving a broadcast message in accordance with the present invention.

The present invention is directed toward a system and method for enhancing reliability in the transmission of broadcast messages. Exemplary wireless network nodes of the present invention transmitting and receiving a broadcast message are illustrated in FIG. 1. Specifically, a source node 10 transmits a broadcast message or packet 4 to a destination node 20. The source node includes a transmitter 12, a receiver 14 and a processor 16. The processor is preferably implemented by a conventional microprocessor or controller and controls node 10 to transmit and receive messages in accordance with communication protocols as described below. The transmitter is preferably implemented by a conventional transmitter and transmits, preferably in the form of radio frequency (RF) signals, messages received from the processor in accordance with processor instructions. Receiver 14 is typically implemented by a conventional receiver and is configured to receive signals transmitted by the transmitter of another node (e.g., preferably in the form of radio frequency (RF) signals). The receiver receives the transmitted signals and forwards the received signals to processor 16 for processing. Destination node 20 is substantially similar to node 10 and includes a transmitter 22, a receiver 24 and a processor 26. The destination node transmitter, receiver and processor are substantially similar to the transmitter, receiver and processor of source node 10 described above.

Source node 10 transmits a broadcast message 4 to destination node 20 utilizing a channel reservation type scheme. As described above, channel reservation type techniques generally employ one or more channels for transmitting data and an additional independent channel for transference of reservation control information (e.g., information to reserve a data channel for transference of the data). Channel reservation typically includes a two-way handshake process. For example, a source node initially reserves data channel space for transmission of a data message or packet. This is accomplished by transmitting a Request-to-Send (RTS) packet to an intended destination node over the reservation channel in response to detecting available data channel space. The RTS packet generally includes information that informs the destination node of the pending data packet and permits the destination node to determine the presence of sufficient available data channel space for the source node to transmit the packet. If the destination node determines that sufficient data channel space is available, a Clear-to-Send (CTS) packet including appropriate information to enable reservation of the data channel space is transmitted over the reservation channel from the destination node to the source node. Once the source node receives the CTS packet, the data packet is transmitted from the source node to the destination node via the reserved data channel space. However, this technique is problematic for broadcast messages since the destination nodes are usually not known, or if the destination nodes are known, collisions within the reservation channel are created due to the transmission of numerous CTS messages by intended destination nodes. These disadvantages degrade reliability of broadcast message transmission and reception.

Figure 2:
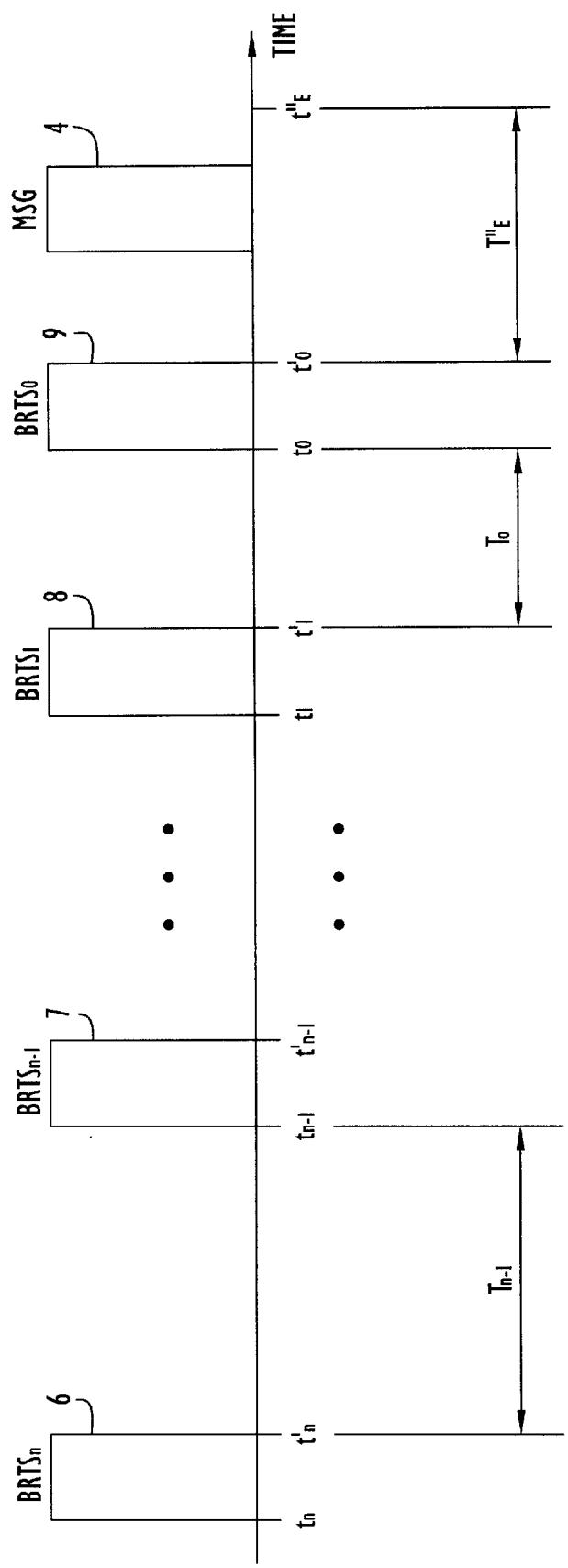
FIG. 2 is a graphical illustration of a time line for broadcasting a message according to the present invention.

The present invention employs a channel reservation type scheme that enhances reliability of transmission and reception of broadcast messages (e.g., messages transmitted from a network node to plural destination network nodes) as illustrated in FIGS. 1–2. Initially, source node 10 desires to transmit broadcast message 4 to network nodes within range of the source node transmitter, including destination node 20. The source node basically transmits a pre-determined quantity or sequence of Request-to-Send type or broadcast notice message or packets (BRTS). These packets each typically include a packet identifier, a data channel for transmission of the broadcast message and other information to facilitate transmission and reception of the broadcast message. Once the final broadcast notice packet in a sequence is transmitted, the source node transmits the broadcast message over the data channel identified in the broadcast notice packets. Thus, the actual interaction between a source node transmitter and destination node receiver is limited. In particular, source node 10 receives a data packet from an upper layer of a communications protocol (e.g., a Medium Access Control (MAC) layer of a communications protocol Data Link Layer which basically transfers data across a shared channel) implemented by processor 16. The source node transmits an initial BRTS packet 6 having an identifier 'n' ($BRTS_n$) and subsequently waits a predetermined time interval to transmit a succeeding BRTS packet 7 having an identifier 'n–1' ($BRTS_{n-1}$): Each packet identifier is preferably in the form of an integer that represents the position of that broadcast notice packet in the sequence prior to transmission of broadcast message 4. For example, $BRTS_3$ indicates that three additional broadcast notice packets (e.g., $BRTS_2$, $BRTS_1$ and $BRTS_o$) are sent prior to transmission of broadcast message 4. The identifiers typically start at a predetermined integer 'n' and are decremented with each successive broadcast notice packet, where $BRTS_n$ represents an initial packet and $BRTS_o$ represents the final packet in the broadcast notice packet sequence. Thus, BRTS packet 7 has an identifier 'n–1' that precedes the identifier 'n' of BRTS packet 6 in the sequence, and the total quantity of broadcast notice packets within the sequence is 'n+1'. Each broadcast notice packet is associated with a transmission start time, $t_i$, and a reception time, $t'_i$, where 'i' represents the packet identifier of a broadcast notice packet within a transmission sequence. The time interval, $T_i$, between transmission of succeeding broadcast notice packets in a sequence (e.g., the interval between reception of a broadcast notice packet having identifier 'i+1' and transmis sion of a broadcast notice message having identifier 'i') may be represented as follows:

$$T_i = \begin{cases} 0 & i = n \\ t_i - t'_{i-1} & i = n-1 \ldots 0 \end{cases}$$

where 'n' represents the identifier of an initial packet within the broadcast notice packet sequence. Thus, the initial transmission packet does not have a delay, while the transmission interval for subsequent broadcast notice packets is determined from the difference between the transmission time of a current packet and the reception time of a prior packet.

Broadcast notice packets are transmitted in sequence at the appropriate transmission times, $t_i$, until a final packet 9 in the sequence ($BRTS_o$) has been sent. After the final broadcast notice packet is transmitted, the source node transmits broadcast message 4. The broadcast message should be received by time $t''_E$, while time $T''_E$ represents the expected time interval to completion of the transmission process after the final broadcast notice packet is received at time $t'_o$. This interval maybe represented as $T''_E = t''_E - t'_o$. The broadcast notice packets are transmitted over the reservation channel in sequence prior to transmission of the broadcast message, while the broadcast message is transmitted in a pre-selected data channel indicated within those packets. The broadcast notice packets enhance the probability of detection by destination nodes of the scheduled broadcast message transmission.

In operation, the time interval between transmissions of broadcast notice packets, $T_i$, and the expected interval time to completion after reception of the final broadcast notice packet in the sequence, $T''_E$, are predefined constants. Accordingly, if a broadcast notice packet having an identifier 'm' ($BRTS_m$; where 'm' is generally in the form of an integer and greater than or equal to zero) is received at a time, $t_x$, the estimated time for the source node transmitting that packet to transmit the final broadcast notice packet in the sequence may be determined as follows:

$$t_o = \begin{cases} t_x - T'_{RTS} & m = 0 \\ t_x + (m-1)T'_{RTS} + \sum_{i=0}^{m-1} T_i & m > 0; \end{cases} \quad (1)$$

where $T_{RTS}$ is the time interval between the start of transmission of a broadcast notice packet at a source node and completion of reception of that packet at a destination node. In other words, $T_{RTS}$ is typically known and may be expressed mathematically as $T_{RTS} = t'_i - t_i$.

The time for reception of the broadcast message, $t''_E$, may be determined from the transmission time of the final broadcast notice packet, the interval between transmission and fig reception of that packet, and the expected time interval to completion, $T_{41\ E}$, as follows:

$$t''_E = t_o + T'_{RTS} + T''_E. \quad (2)$$

Substituting the expressions for to from equation (1) into equation (2), the reception time for a broadcast message by a destination node, $t''_E$, may be determined as follows:

$$t''_E = \begin{cases} t_x + T''_E & m = 0 \\ t_x + mT'_{RTS} + T''_E + \sum_{i=0}^{m-1} T_i & m > 0. \end{cases} \quad (3)$$

As discussed above, the transmission interval between broadcast notice packets, $T_i$, and the interval between transmission of the broadcast notice packet in a sequence and reception of the broadcast message, $T''_E$, are pre-defined. Thus, the transmission and propagation intervals of a broadcast notice packet are known. Accordingly, a destination node may determine the transmission time, $t_o$, of a final broadcast notice packet from equation (1) above based on the broadcast notice packet identifier and the known values of $T_{RTS}$, $T_i$, and the reception time, $t_x$, of the broadcast notice packet. The destination node may further apply the determined $t_o$ value and the known $T'_{TRS}$ and $T'_E$ values to equation (2) above and predict the scheduled transmission time of a broadcast message. Since the destination node is aware of the transmission time of the broadcast message, that message is received unless the destination node somehow misses all of the transmitted broadcast notice packets in a sequence. This occurrence is infrequent and unlikely, thereby enhancing reliability of the broadcast message. Further, since reception of the broadcast message is enhanced, occurrence of collisions within the data channel utilized for transmission of the broadcast message is similarly reduced.

Figure 3:
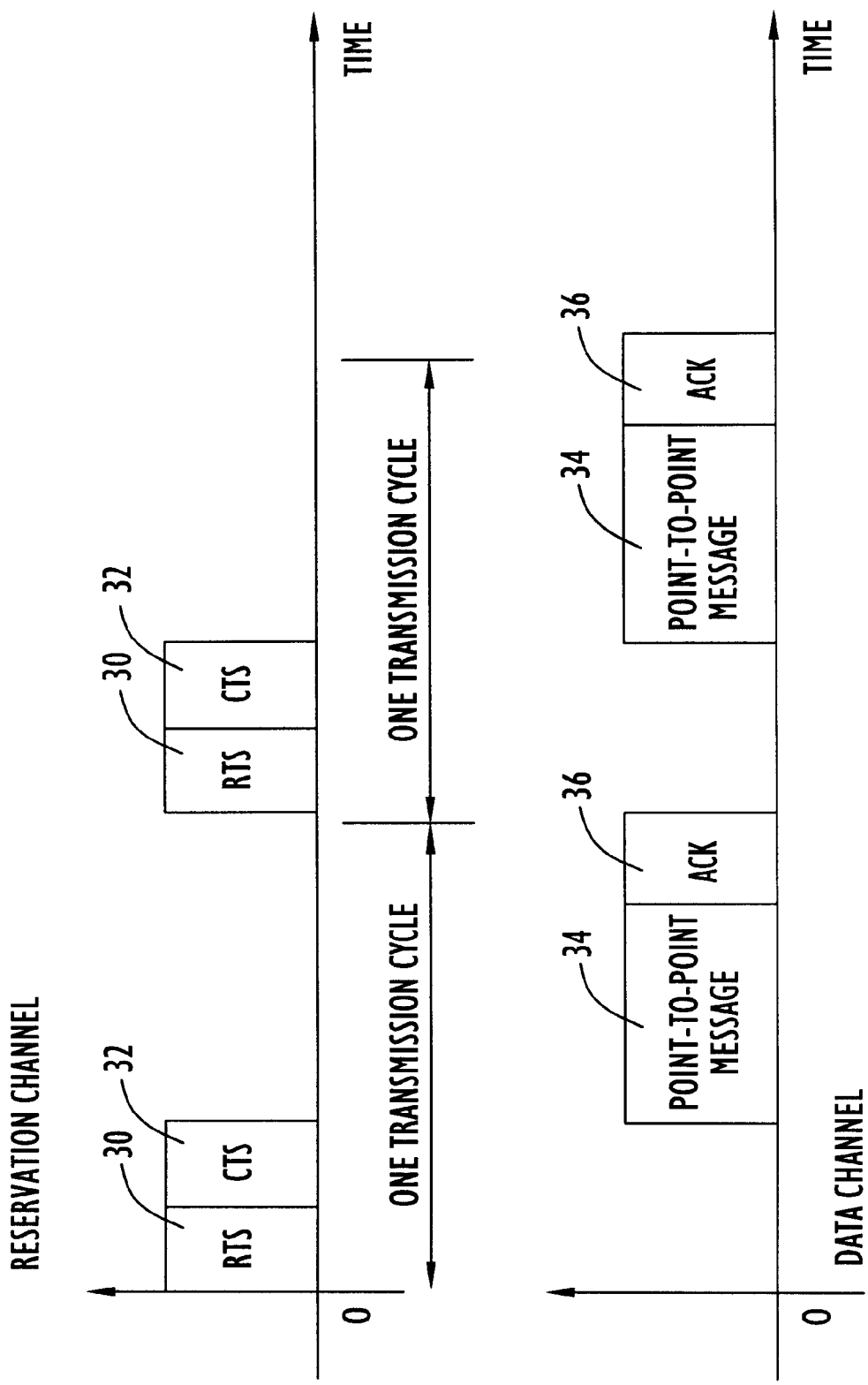
FIG. 3 is a graphical illustration of a timing diagram for transmission of a point-to-point message.

Basically, the above broadcast transmission protocol sacrifices reservation channel capacity to achieve enhanced transmission performance. This trade-off is feasible since the reservation channel typically has a low utilization rate as illustrated in FIG. 3 by an exemplary network employing a conventional channel reservation protocol as described above to transmit point-to-point messages. In particular, a network source node initially transmits to a particular destination node a Request-to-Send (RTS) packet 30 on a reservation channel to indicate that a point-to-point message 34 is to be sent. The destination node receives the RTS packet and responds with a Clear-to-Send (CTS) packet 32 over the reservation channel to reserve a particular data channel and indicate that the message may be transmitted as described above. Message 34 and an acknowledgment 36 are subsequently sent to the destination node via the reserved data channel. The above data transference occurs within each transmission cycle and is exemplary of a maximum channel utilization rate. By way of example only: the network RTS, CTS and acknowledgment packets each include forty-six bits; the message includes 2,048 bits; the data channels may be used continuously for transmission of the messages; and there is no propagation delay for message transmissions.

As discussed above, an RTS and CTS packet are transmitted over the reservation channel with an acknowledgment packet sent over the data channel for each transmitted point-to-point message. Therefore, 2,094 bits (e.g., 2,048 bits for the message and forty-six bits for the acknowledgment) are transmitted over the data channel, while ninety-two bits (e.g., forty-six bits for each of the RTS and CTS packets) are transmitted over the reservation channel. Since the transmission cycle is repeated without propa gation delay, the utilization rate of the reservation channel when one channel is employed for packet transmission is:

$$\frac{RTS \text{ packet} + CTS \text{ packet}}{\text{Message} + \text{Acknowledgment}} = \frac{46 + 46}{2048 + 46} = 4.39\%$$

Figure 4:
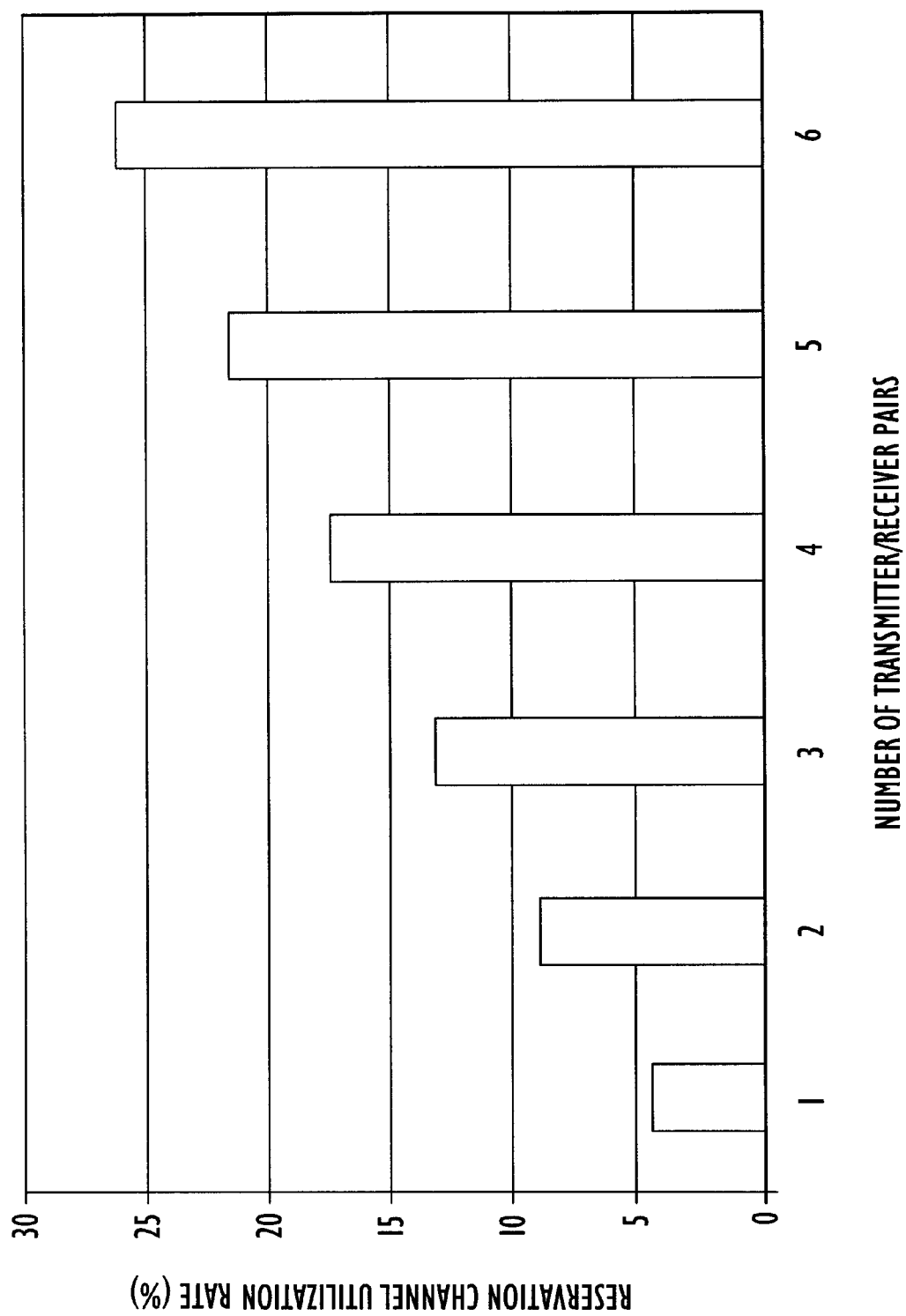
FIG. 4 is a graphical illustration of the relationship between the rate of reservation channel utilization and the quantity of transmitter/receiver node pairs for an exemplary network.

Thus, the reservation channel utilization rate under normal conditions should be less than 4.39% when one source node/destination node pair is employed. However, if 'P' node pairs (e.g., where P is greater than one) within radio range engage in simultaneous message transmissions, the reservation channel utiization upper limit is 4.39% multiplied by 'P' (e.g., 4.39P%). A plot of the relationship between the reservation channel utilization upper limit and quantity of node pairs engaged in simultaneous message transmissions is illustrated in FIG. 4.

When the exemplary network employs two data channels, simultaneous message transmissions may occur. For example, if the exemplary network included ten nodes or five node pairs (e.g., 'P' equal to five) within radio range, the upper limit of reservation channel utilization is 4.39% multiplied by five, or 21.95%. Since the network nodes require special positioning to enable power control functionality and the channel reservation scheme to accommodate channel reservation and simultaneous transmissions by such nodes, it is unlikely that this quantity of nodes would conduct simultaneous transmissions within the exemplary network. Thus, for normal operating conditions, the reservation channel utilization of the network should not be greater than 21.95%, thereby indicating low utilization of the reservation channel. Since the reservation channel has a low utilization rate, and since broadcast traffic in a wireless network typically occupies a low percentage of the overall network traffic, the increased traffic load in the reservation channel by the present invention has a limited and minimal effect on the condition of the reservation channel.

Figure 5A:
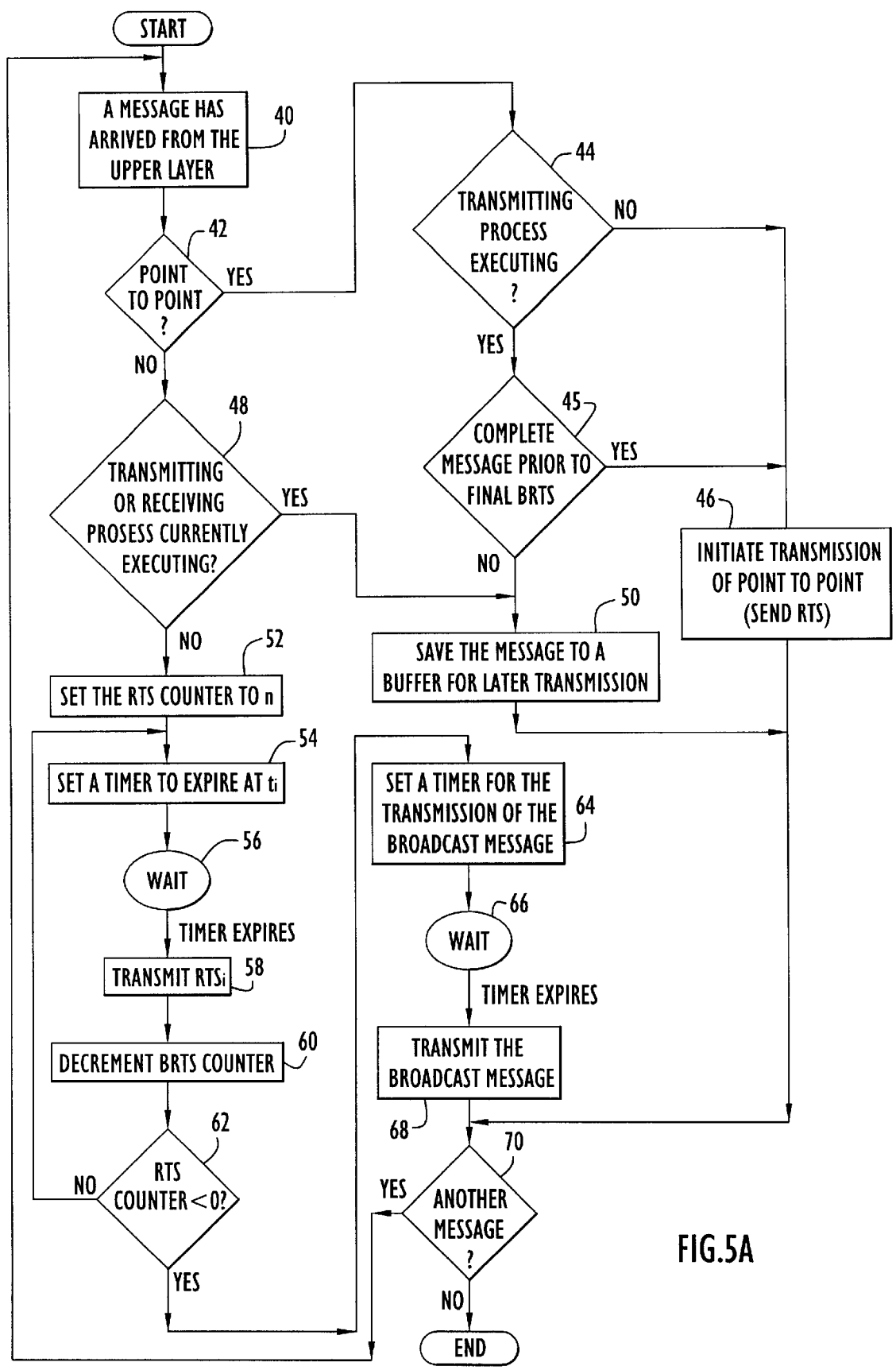
FIGS. 5A–5B are procedural flow charts illustrating the manner in which a network node transmits a broadcast message according to the present invention.

Each present invention node within a network may function as a source node and destination node to transmit and receive broadcast messages. The processor within each node controls the node to transmit and receive broadcast messages in accordance with the plural broadcast notice packet scheme described above. Receiving and transmission processes or state machines are executed by the processor in parallel with each associated with a particular broadcast message and functioning as an independent process to facilitate handling of transmission and reception of that message. Each receiving process further identifies its associated broadcast message to facilitate handling of messages received by different plural source nodes. The manner in which a node processor controls a node to transmit point-to-point and broadcast messages according to the present invention is illustrated in FIG. 5A. Initially, a transmitting process or state machine is created within the node processor and executed when a broadcast message is received from an upper layer of a communications protocol employed by the network and implemented by the processor. Specifically, a message is received from an upper layer of the communications protocol at step 40 (e.g., the MAC Layer of a protocol Data Link Layer as described above). If the message is a point-to-point message as determined at step 42, the processor determines the existence of a broadcast transmission process at step 44. When a broadcast transmission process exists and transmission of the point-to-point message may be accomplished prior to transmission of a final broadcast notice packet (BRTS$_o$) of the existing process as determined at step 45, transmission of the point-to-point message to the intended destination node is initiated (e.g., an RTS packet is transmitted) at step 46. The processor basically calculates the transmission time, $t_o$, of the final broadcast notice packet within the transmission sequence from the aforementioned equations as described above in order to determine the feasibility of completing transmission of the point-to-point message prior to that packet transmission time. Transmission of the point-to-point message is further initiated at step 46 when the processor determines at step 44 that no broadcast transmission processes exist. If the point-to-point message can not be transmitted prior to transmission of the final broadcast notice packet, the message is stored in a buffer for subsequent transmission at step 50.

If the message received from the upper protocol layer is a broadcast message as determined at step 42, the processor determines at step 48 the existence of broadcast receiving or transmission processes. If either of these processes exist, the broadcast message is saved in a buffer for subsequent transmission at step 50. When no broadcast processes exist, a new process or state machine is created for the received message and a counter for the broadcast notice packets is initialized to the initial packet identifier (e.g., 'n', typically in the form of an integer greater than zero) at step 52. A transmission timer is set at step 54 to expire at time, $t_i$, or the transmission time of a broadcast notice packet (e.g., having an identifier 'i' commensurate with the value of the packet counter). The processor waits for expiration of the timer at step 56, and subsequently controls the transmitter to transmit the broadcast notice packet at step 58. After transmission of that packet, the packet counter is decremented at step 60 and typically provides the packet identifier for the succeeding broadcast notice packet. If the counter has a value greater than zero as determined at step 62, thereby indicating that transmission of a final broadcast notice packet ($BRTS_o$) has not occurred, the transmission timer is re-set at step 54 and subsequent broadcast notice packets within the sequence (e.g., having packet identifiers 'i' commensurate with the packet counter value) are transmitted as described above. When the counter attains a value less than zero as determined at step 62, the final broadcast notice packet has been transmitted and a broadcast timer is initialized for transmission of a broadcast message at step 64. The processor waits for expiration of the broadcast timer at step 66, and subsequently controls the transmitter to transmit the broadcast message at step 68. If additional messages (e.g., new messages or messages stored in the buffer) require processing as determined at step 70, the messages are processed as described above.

Figure 5B:
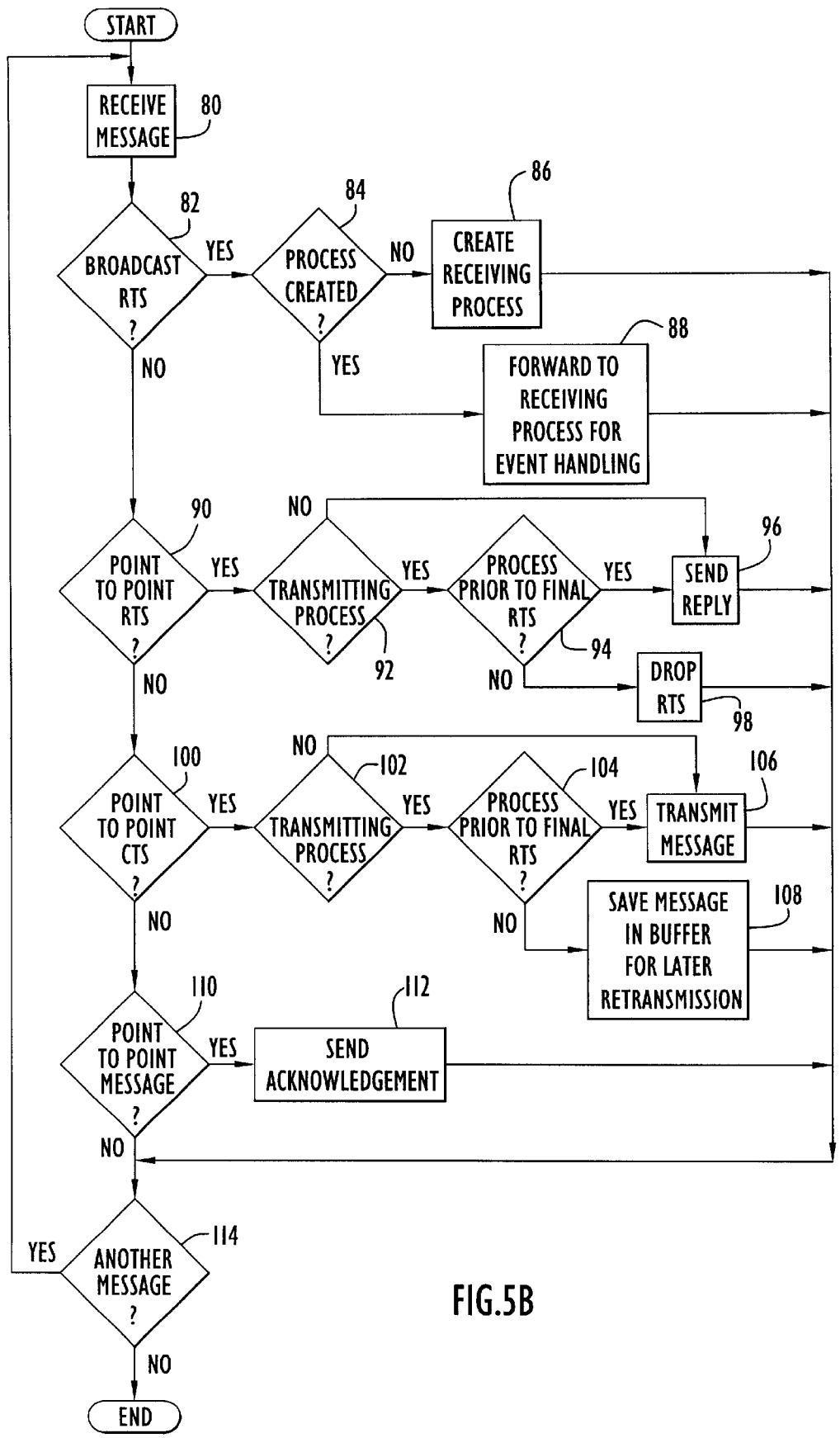

The processor may further handle various messages that are received by the node during a broadcast transmission process as illustrated in FIG. 5B. Specifically, a message is received by the node at step 80. If the received message is a broadcast notice packet for a broadcast message as determined at step 82, the processor determines the existence of a corresponding process or state machine to handle that message at step 84. When a process for the broadcast notice packet does not exist, a new process is created to handle that packet at step 86. Otherwise, the received packet is forwarded at step 88 to the corresponding existing process for event handling as described below.

When the received message is identified as an RTS packet for a point-to-point message at step 90, the processor determines the existence of a broadcast transmission process at step 92. If a transmission process exists and the point-to-point message may be received prior to transmission of a final broadcast notice packet as determined at step 94, a reply or CTS packet is transmitted at step 96 to facilitate transmission and reception of the point-to-point message. The processor basically calculates the transmission time, $t_o$, of the final broadcast notice packet from the aforementioned equations as described above to determine the feasibility of completing reception of the point-to-point message prior to that packet transmission time. The reply is further transmitted at step 96 in response to the processor determining that no transmitting processes exist at step 94. When the point-to-point message can not be received prior to transmission of a final broadcast notice packet for an existing transmission process as determined at step 94, the received RTS packet is dropped at step 98.

When the received message is a point-to-point CTS packet as determined at step 100, the processor determines the existence of a broadcast transmission process at step 102. If a process exists and the point-to-point message may be transmitted prior to transmission of a final broadcast notice packet for the existing process as determined at step 104, the pending point-to-point message is transmitted at step 106. The processor basically calculates the final broadcast notice packet transmission time from the aforementioned equations as described above to determine the feasibility of transmitting the point-to-point message prior to the final broadcast notice packet transmission time. The point-to-point message is further transmitted at step 106 in response to the processor determining that no transmitting processes exist at step 102. When the point-to-point message can not be transmitted prior to transmission of a final broadcast notice packet of an existing transmission process as determined at step 104, the CTS packet is ignored and the pending point-to-point message is stored in a buffer for subsequent transmission at step 108.

When the received message is identified as a point-to-point message at step 110, an acknowledgment is transmitted to the source node at step 112. If additional messages require processing (e.g., new messages or messages stored in the buffer) as determined at step 114, the messages are processed as described above. The above processing scheme of FIGS. 5A–5B allows transmission and reception of point-to-point messages in a manner that efficiently utilizes channel space during execution of a broadcast transmission process. However, no transmission of a broadcast message is initiated during execution of a broadcast transmission or receiving process in order to reduce traffic load on the reservation channel.

Figure 6A:
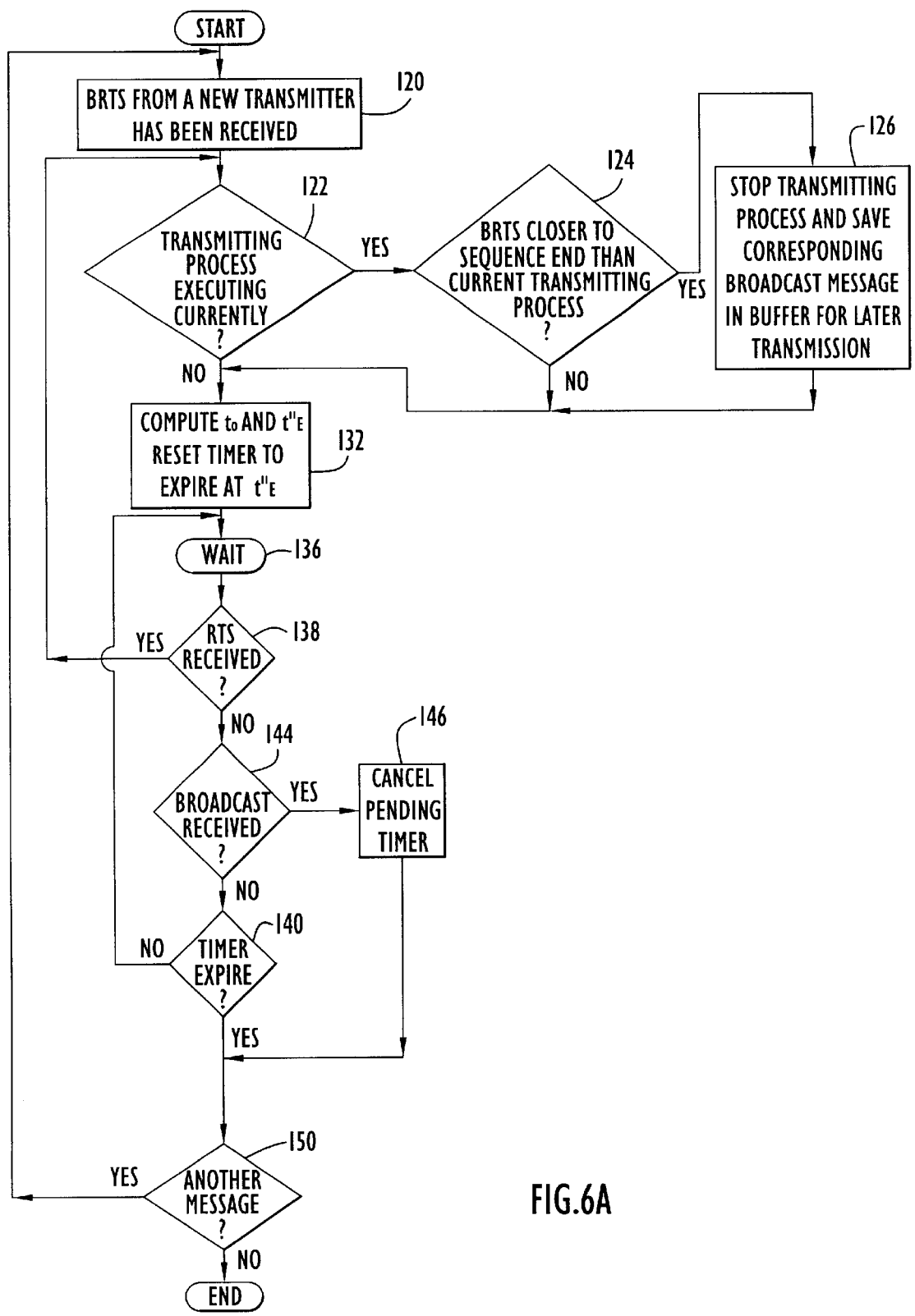
FIGS. 6A–6B are procedural flow charts illustrating the manner in which a network node receives and processes a broadcast message according to the present invention.

The manner in which a node processor controls the node to receive a broadcast message is illustrated in FIG. 6A. Initially, a receiving process or state machine is created in response to receiving an initial broadcast notice packet from a source node prior to transmission of the associated broadcast message. Specifically, a broadcast notice packet is received from a new source node at step 120 and a receiving process or state machine is created for the associated broadcast message. If a broadcast transmission process is executing as determined at step 122, the processor at step 124 determines whether or not the transmission process can transmit a broadcast message prior to reception of the broadcast message associated with the received broadcast notice packet. The transmission and reception times of the respective broadcast messages are determined from the respective packet identifiers and the aforementioned equations as described above. Alternatively, the identifiers of the respective packets may be compared to determine the earlier of the transmission or reception time. Basically, the packet having an identifier with a lesser value indicates the associated message having an earlier transmission or reception time. When reception of the broadcast message associated with the received packet is determined to occur prior to transmission of the broadcast message associated with the executing transmission process, the transmission process is interrupted and the associated broadcast message is stored in a buffer at step 126 for subsequent transmission after reception of the message associated with the received packet. When a broadcast transmission process is not executing as determined at step 122, or when reception of the message associated with the received packet occurs after transmission by the executing broadcast process as determined at step 124, the node determines the transmission time, $t_o$, of the final broadcast notice packet in the sequence associated with the received packet and the estimated time of completion of the reception process, $t''_E$, from the aforementioned equations as described above, and sets a reception timer for the expected reception time of the message, $t''_E$, at step 132. This determination and timer initialization are similarly performed subsequent to message storage at step 126. The reception time is utilized by the receiver in order to direct the node to the appropriate data channel at a proper time to receive the broadcast message. Subsequently, the node waits at step 136 for the reception time of the next broadcast notice packet in the sequence or the broadcast message. Since network or other conditions may affect transmission and reception of broadcast notice packets, a broadcast message may be received by the node without prior reception of each broadcast notice packet in a sequence. Thus, the node identifies reception of a broadcast message that may be received out of sequence relative to the broadcast notice packets.

When the broadcast notice packet is received as determined at step 138, that packet is processed as described above. If the broadcast message is received as determined at step 144, the reception timer is canceled at step 146. The node basically waits for a broadcast notice packet or the broadcast message until expiration of the reception timer or, in other words, until the expected reception time of the broadcast message has elapsed as determined at step 140. If additional messages or packets (e.g., received from a new source node or stored in the buffer) require processing as determined at step 150, the messages or packets are processed as described above.

Figure 6B:
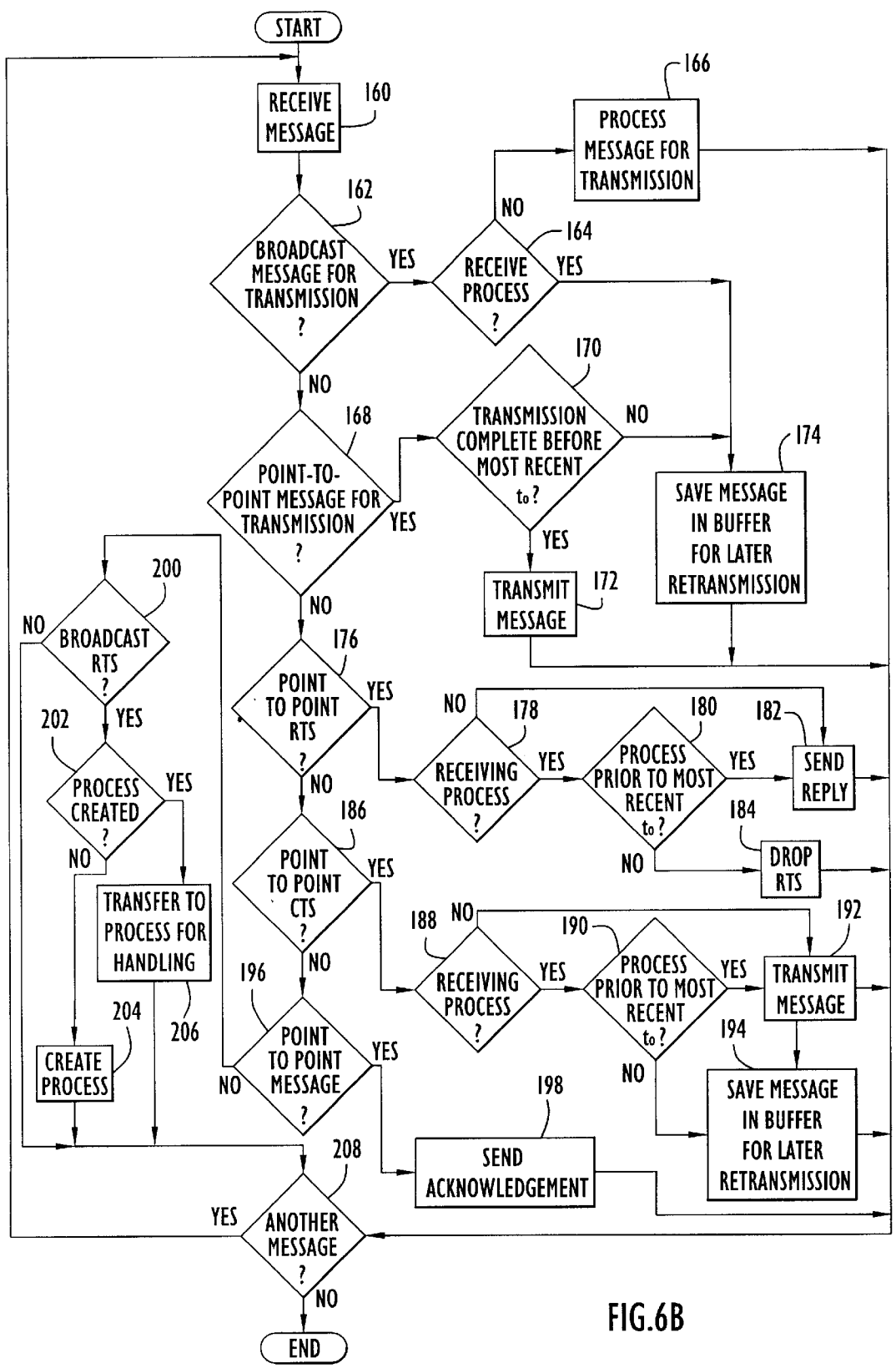

The processor may further handle various messages that are received or generated by the node during the receiving process as illustrated in FIG. 6B. Specifically, a message is received by a node at step 160. If the message is a broadcast message received from a communications protocol upper layer (e.g., the MAC Layer as described above) for transmission by the node as determined at step 162, the processor determines the existence of an executing broadcast transmission or receiving process at step 164. When a broadcast process is executing, the broadcast message is stored in a buffer for subsequent transmission at step 174. Otherwise, the message is processed for transmission at step 166 in the manner described above for FIG. 5A. This reduces the quantity of broadcast notice packets being transmitted in the reservation channel.

When the received message is a point-to-point message received from a communications protocol upper layer (e.g., the MAC Layer as described above) for transmission as determined at step 168, the processor determines the time interval available before the transmission time, $t_o$, of a final broadcast notice packet for each broadcast message receiving process. This is typically accomplished by examining identifiers of recently received broadcast notice packets and determining the time based on the aforementioned equations as described above. If the point-to-point message can be transmitted prior to the earliest time, $t_o$, for the existing broadcast receiving processes as determined at step 170, transmission of the received point-to-point message is initiated (e.g., an RTS packet is transmitted) at step 172. Otherwise, the point-to-point message is stored in a buffer for subsequent transmission at step 174. The messages stored in the buffer are transmitted after completion of the receiving process as described above.

If the received message is an RTS packet for a point-to-point message as determined at step 176, the processor determines the existence of a broadcast receiving process at step 178. If a broadcast receiving process exists, the processor determines the time interval available before the transmission time, $t_o$, of a final broadcast notice packet for each existing broadcast receiving process as described above. If the point-to-point message may be received prior to the earliest final packet transmission time, $t_o$, of the existing broadcast receiving processes, a reply or CTS packet is transmitted at step 182 to facilitate transmission and reception of the point-to-point message. The reply is further transmitted at step 182 in response to the processor determining that no broadcast receiving process exists at step 178. When the point-to-point message can not be received prior to the earliest final packet transmission time as determined at step 180, the RTS packet is dropped at step 184.

When the received message is a point-to-point CTS packet as determined at step 186, the processor determines the existence of a broadcast receiving process at step 188. If a broadcast receiving process exists, the processor determines the time interval available before the transmission time, $t_o$, of a final broadcast notice packet for each existing broadcast receiving process as described above. If the point-to-point message may be transmitted prior to the earliest final packet transmission time, $t_o$, of the existing broadcast receiving processes as determined at step 190, the point-to-point message is transmitted at step 192. The point-to-point message is further transmitted at step 192 in response to the processor determining that no broadcast receiving process exists at step 188. When the point-to-point message can not be transmitted prior to the earliest final transmission time as determined at step 190, the CTS packet is ignored and the point-to-point message is stored in a buffer for subsequent transmission at step 194.

If the received message is a point-to-point message as determined at step 196, an acknowledgment is transmitted to the source node at step 198.

When the received message is a broadcast notice packet (BRTS) as determined at step 200, the processor determines the existence of a corresponding broadcast receiving process at step 202. If a broadcast receiving process associated with the received packet does not exist, a new process is created at step 204; otherwise, the received packet is forwarded to the corresponding process at step 206. The received packet is subsequently processed in substantially the same manner described above for FIG. 6A. If additional messages require processing (e.g., new messages or messages stored in the buffer) as determined at step 208, the messages are processed as described above. The above processing scheme of FIGS. 6A–6B allows transmission and reception of point-to-point messages in a manner that efficiently utilizes channel space during execution of a broadcast receiving process. However, no transmission of a broadcast message is initiated during execution of a broadcast transmission or receiving process in order to reduce traffic load on the reservation channel. The various received packets (e.g., RTS, BRTS, CTS, etc.) typically include an identifier to indicate the type of message (e.g., broadcast or point-to-point) being sent.

Figure 7:
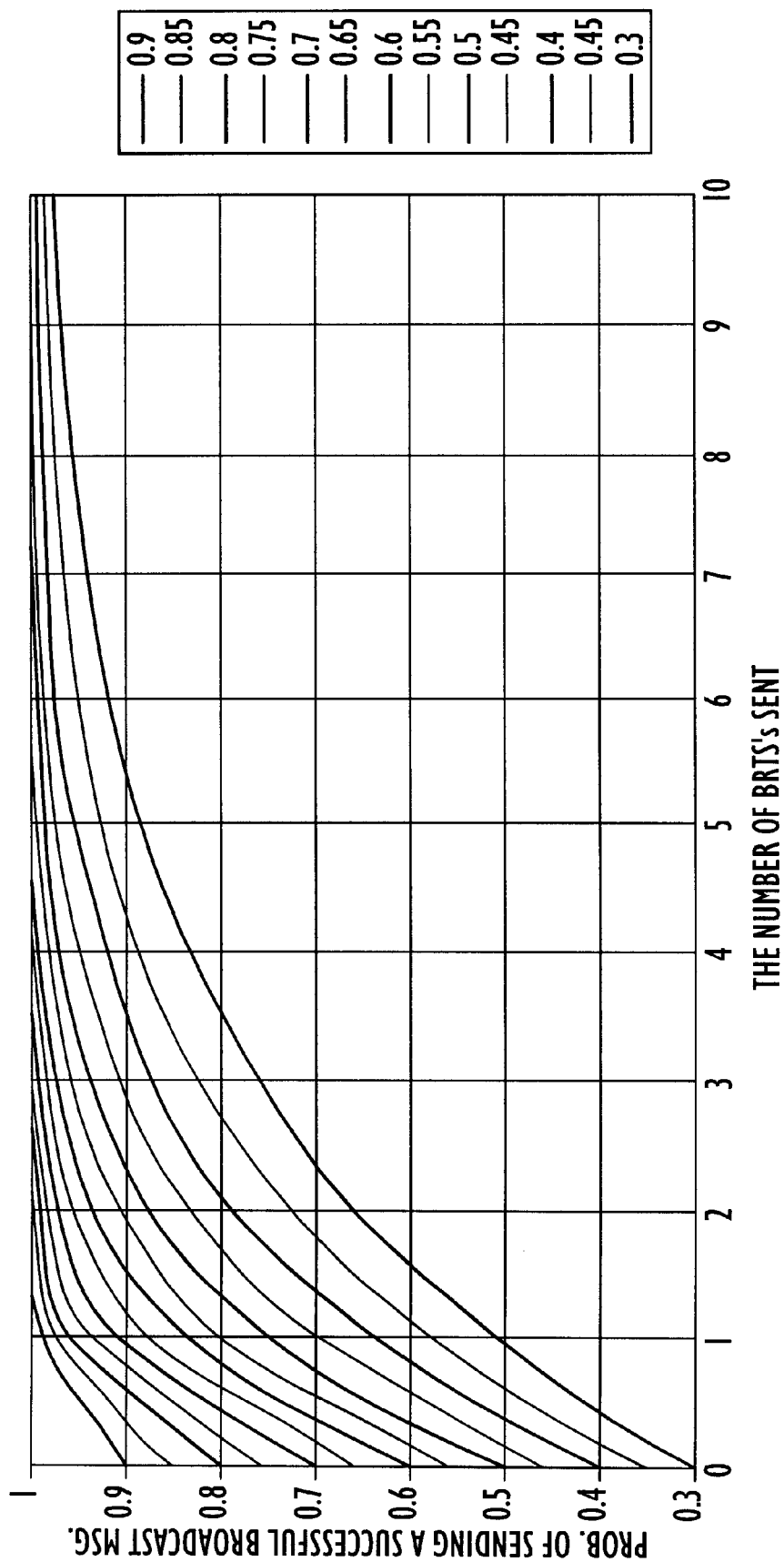
FIG. 7 is a graphical illustration of the relationship between the probability of success of transmitting a broadcast message and the quantity of broadcast notice messages (BRTS) employed in accordance with the present invention.

As discussed above, a destination node fails to receive a broadcast message only in the event that all broadcast notice packets are missed. Since plural broadcast notice packets are used to indicate transmission of a pending broadcast message, the probability of failing to receive the broadcast notice packets should decrease as the quantity of broadcast notice packets employed by the scheme increases. For example, and with reference to the exemplary network described above for FIGS. 3–4, $P_{idle}$ represents the probability that all channels are idle, while $P_{idlej}$ represents the probability of a channel being idle from the perspective of a node. Accordingly, $$P_{idle} = \prod_{j=0}^{r=2} P_{idle,j} \tag{4}$$

where 'j' is in the form of an integer generally greater than or equal to one and represents a channel; 'r' is in the form of an integer and represents the quantity of channels; and the exemplary network includes two channels (e.g., 'r' equals two) as described above. Further, $P_{succ}$ represents the probability of successfully transmitting a broadcast message employing the scheme of the present invention, and from equation (4) above may be defined as follows:

$$P_{succ} = 1 - (1 - P_{idle})^{k+1} = 1 - \left(1 - \prod_{j=0}^{r=2} P_{idle,j}\right)^{k+1} \tag{5}$$

where k is in the form of an integer generally greater than or equal to zero and indicates the quantity of broadcast notice packets employed (e.g., k=n+1 with respect to FIG. 2). A plot of the relationship between $P_{succ}$ and the quantity of broadcast notice packets (k) employed for various values of $P_{idle}$ is illustrated in FIG. 7. The plot indicates that for a fixed value of $P_{idle}$, the value of $P_{succ}$ increases as the quantity of broadcast notice packets increases. In fact, the value of $P_{succ}$ may be controlled by adjusting the quantity of broadcast notice packets according to the relationship defined in equation (5) above. Thus, a desirable transmission performance may be maintained by employing an appropriate quantity of broadcast notice packets in the scheme of the present invention.

Figure 8:
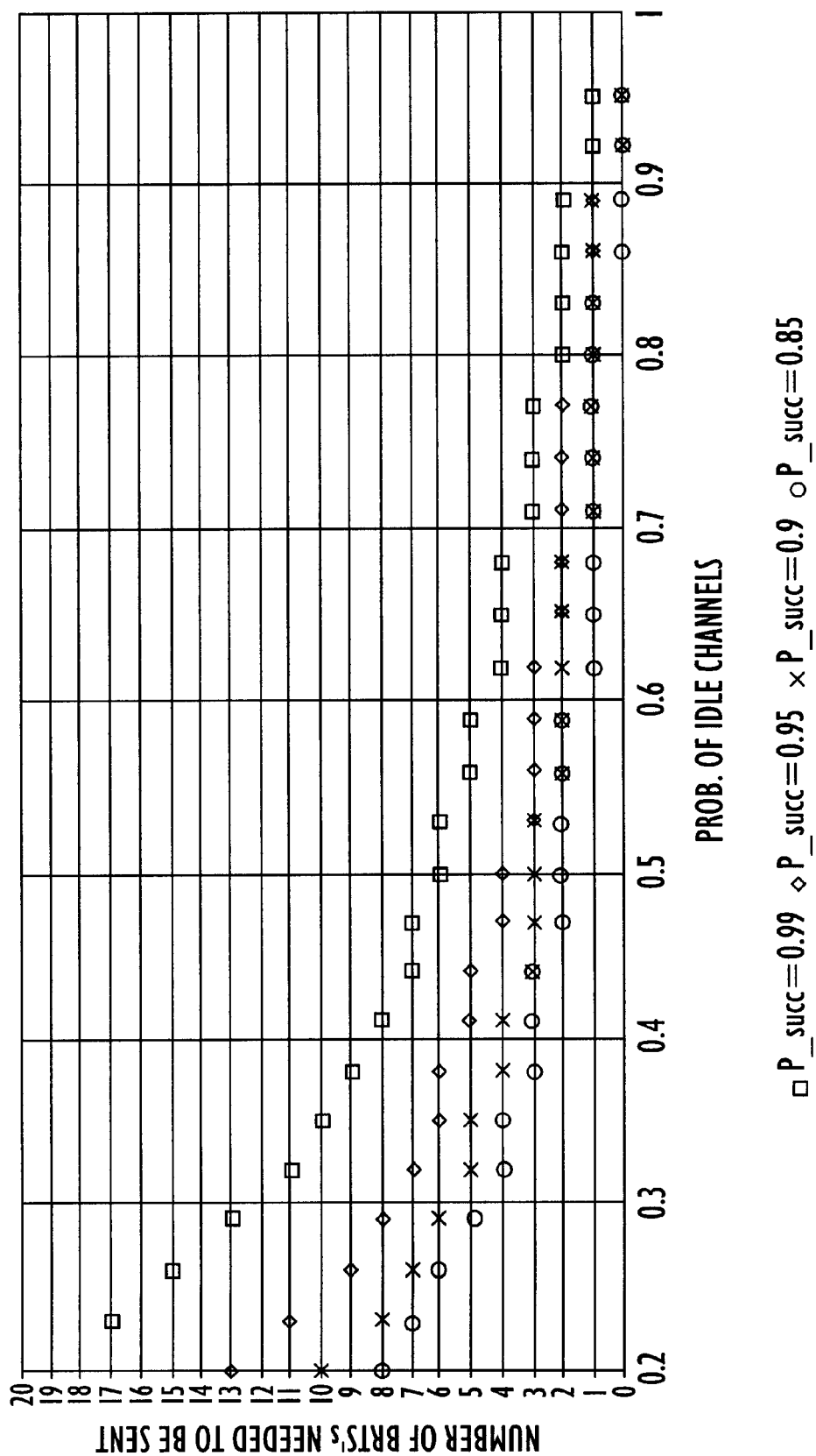
FIG. 8 is a graphical illustration of the quantity of broadcast notice messages (BRTS) required for various probabilities of idle channels to achieve particular probabilities of success in accordance with the present invention.

Accordingly, the present invention may be employed in an adaptive configuration to achieve a desired performance. Basically, the present invention may vary the quantity of broadcast notice packets utilized within each broadcast transmission process according to the condition of the channels. In other words, a greater quantity of broadcast notice packets are employed when channels are heavily utilized, while a lesser quantity is employed for low channel utilization. The quantity of broadcast notice packets (k) maybe derived from equation (5) above and is determined as follows:

$$k = \left\lceil \frac{\log(1 - P_{succ})}{\log(1 - P_{idle})} - 1 \right\rceil = \left\lceil \frac{\log(1 - P_{succ})}{\log\left(1 - \prod_{j=0}^{r=2} P_{idle,j}\right)} - 1 \right\rceil \tag{6}$$

where the brackets ('[ ]') indicate an operator that provides an integer larger than or equal to the enclosed value. A plot of the quantity of broadcast notice packets required to maintain particular $P_{succ}$ values (e.g., 0.99, 0.95, 0.9 and 0.85) for various probabilities of idle channels is illustrated in FIG. 8. If the value of $P_{idle}$ is known when a broadcast transmission process is initiated, the value of $P_{succ}$ may be maintained at a desirable level by using the appropriate quantity of broadcast notice packets. Since $P_{idle}$ is typically unknown, a conventional adaptive estimation technique maybe utilized to determine the values of $P_{idle}$ or $P_{idlej}$ thereby enabling dynamic determination of the quantity of broadcast notice packets (k) to employ from equation (6) above. Thus, this dynamic determination enables maintaining performance of the scheme at a pre-defined or desired success level.

The transmission processes within node processors may dynamically determine the quantity of broadcast notice packets to transmit prior to sending a broadcast message. Since each broadcast notice packet includes an identifier indicating a position of that packet within a sequence as described above, the packet quantity maybe altered by the source node without affecting the processing by a destination node. In other words, the destination node determines the message reception time based on the received identifier as described above, and receives the message at the appropriate time regardless of the value or change in the packet quantity. Basically, the destination node determines a reception time based on the most recently received packet identifier.

The present invention enables messages to be broadcasted across a communication network having any quantity of nodes, where the network nodes are substantially similar to each other and to source node 10 and destination node 20 described above for FIG. 1. Each network node receiving a broadcast message typically transmits that message in the manner described above to its neighbors to facilitate propagation of the message through the network.

It will be appreciated that the embodiments described above and illustrated in the drawings represent only a few of the many ways of implementing a method and apparatus for broadcasting messages in channel reservation communication systems.

The communication networks employing the present invention nodes may include any quantity of those nodes. The nodes may communicate via any suitable communications medium (e.g., wired or wireless communication devices, etc.) and utilize any quantities of reservation and data channels. The present invention node may include any quantity of conventional or other transmitters, where each transmitter may transmit signals at any suitable frequency and in any suitable energy form (e.g., radio signals, microwave, optical signals, etc.), and any quantity of conventional or other receivers, where each receiver may receive signals at any suitable frequency and in any suitable energy form (e.g., radio signals, microwave, optical signals, etc.). Alternatively, the present invention node may include any quantity of combined transmitting/receiving devices.

The processor of the present invention node maybe implemented by any conventional or other microprocessor, controller or circuitry to perform the functions described herein, while any quantity of processors or processing devices or circuitry may be employed within the present invention node where the processor functions may be distributed in any fashion among any quantity of modules, processors or other processing devices or circuits. The software for the processor of the present invention node may be implemented in any suitable computer language, and could be developed by one of ordinary skill in the computer and/or programming arts based on the functional description contained herein and the flow charts illustrated in the drawings. Further, any references herein of software performing various functions generally refer to processors performing those functions under software control. The software and/or algorithms described above and illustrated in the flow charts may be modified in any manner that accomplishes the functions described herein.

The broadcast notice (BRTS) and other packets or messages (e.g., RTS, CTS, acknowledge, point-to-point message, broadcast message, etc.) may be of any size, may have any format, and may contain any desired information. Further, the various messages may include any identifier to identify the type of message or packet. The communication network may employ any suitable communications protocol to facilitate reception, processing and transference of messages or packets. The present invention may send any quantity of broadcast notice packets at any desired transmission intervals prior to transmission of the broadcast message. The broadcast notice packet identifiers may be any numeric value, alphanumeric character or other symbol, preferably having a known or assignable position within an associated identifier sequence. The broadcast notice packets may be transmitted in any suitable order capable of identifying a transmission time of a final broadcast notice packet or broadcast message. The present invention node may prioritize processing of broadcast, point-to-point or other messages in any fashion. The buffer may be implemented by any suitable storage device (e.g., processor memory, external memory, file, data structure (e.g., array, queue, stack, etc.), etc.) to store messages for subsequent processing.

The present invention may utilize any quantity of broadcast notice packets, where the quantity may be predetermined and fixed or dynamically adjusted to any desired value. The adjustment may be based on any network conditions or other desired parameters. For example, the quantity may be altered based on channel utilization or network traffic or to maintain a particular network performance level. The probability of idle channels may be estimated utilizing any conventional or other techniques to determine the appropriate quantity of broadcast notice packets for a particular performance level. The above equations may be modified in any manner, or any conventional or other techniques may be employed by the present invention to determine the quantity of broadcast notice packets to transmit and the transmission and reception times of broadcast packets or messages. Further, the processor of the present invention node may determine transmission and reception times of point-to-point and other messages via any conventional or other techniques.

It is to be understood that the present invention is not limited to the applications or networks described herein, but may be utilized for various communication applications or networks, especially those employing channel reservation techniques. Since the present invention does not employ hand-shaking with destination nodes (e.g., CTS packets are not utilized), the present invention is suitable for applications where two-way hand shaking is not feasible, such as one-to-multipoint messages (e.g., broadcast and multicast messages). However, the present invention may further be applied to hand-shaking applications and for any types of messages.

From the foregoing description, it will be appreciated that the invention makes available a novel method and apparatus for broadcasting messages in channel reservation communication systems wherein plural broadcast notice messages are transmitted prior to transmission of the broadcast message.

Having described preferred embodiments of a new and improved method and apparatus for broadcasting messages in channel reservation communication systems, it is believed that other modifications, variations and changes will be suggested to those skilled in the art in view of the teachings set forth herein. It is therefore to be understood that all such variations, modifications and changes are believed to fall within the scope of the present invention as defined by the appended claims.

What is claimed is:

1. In a communications network, a communication unit to transmit and receive messages within said network comprising:
    a transmitter to transmit an outgoing message to at least one other communication unit within said network;
    a receiver to receive an incoming message from at least one other communication unit within said network; and
    a processor to control said transmission and reception of said outgoing and incoming messages, wherein said processor includes:
        a broadcast notification module to facilitate transmission of a sequence of plural broadcast notification messages to said at least one other communication unit prior to transmission of a pending broadcast message to notify said at least one other communication unit of said pending broadcast message, wherein said broadcast notification messages within said sequence include information enabling said at least one other communication unit to determine when transference of said pending broadcast message to said at least one other communication unit is to occur; and
        a broadcast transmission module to facilitate transmission of said pending broadcast message to said at least one other communication unit subsequent to transmission of said sequence of plural broadcast notification messages.

2. The unit of claim 1 wherein said information of each said broadcast notification message includes an identifier indicating said position of that notification message within said sequence.

3. The unit of claim 2 wherein said broadcast notification module includes a transmission sequence module to facilitate transmission of each broadcast notification message at a particular time interval and in accordance with said position of that notification message within said sequence indicated by said identifier associated with that notification message.

4. The unit of claim 1 wherein said transmitter transmits said outgoing message in the form of radio signals.

5. The unit of claim 1 wherein said receiver receives said incoming message in the form of radio signals.

6. The unit of claim 2 wherein said processor further includes:
    a notification reception module to facilitate reception of said broadcast notification messages and to determine a reception time for said pending broadcast message based on said identifier of each received broadcast notification message; and
    a broadcast reception module to facilitate reception of said pending broadcast message by said determined reception time.

7. The unit of claim 2 wherein said network includes a reservation channel for conveyance of data channel reservation information and at least one data channel for conveyance of data, and wherein said communication unit transmits said broadcast notification messages over said reservation channel and transmits said pending broadcast message over a data channel indicated in said transmitted broadcast notification messages.

8. The unit of claim 1 wherein said processor further includes a transmission control module to store said pending broadcast message in a storage unit in response to said communication unit transmitting or receiving another broadcast message.

9. The unit of claim 1 wherein said processor further includes a message quantity module to dynamically determine a quantity of broadcast notification messages to transmit prior to transmission of said pending broadcast message based on network parameters.

10. In a communications network, a communication unit to transmit and receive messages within said network comprising:
  a transmitter to transmit an outgoing message to at least one other communication unit within said network;
  a receiver to receive an incoming message from at least one other communication unit within said network; and
  a processor to control said transmission and reception of said outgoing and incoming messages, wherein said processor includes:
    a broadcast notification module to facilitate transmission of a plurality of broadcast notification messages in a particular transmission sequence to said at least one other communication unit, wherein said broadcast notification messages notify said at least one other communication unit of a pending broadcast message, and wherein each said broadcast notification message includes an identifier indicating a position of that notification message within said transmission sequence;
    a broadcast transmission module to facilitate transmission of said pending broadcast message to said at least one other communication unit subsequent to transmission of said plurality of broadcast notification messages within said transmission sequence; and
    a message control module to prioritize transmission of said pending broadcast message with respect to other messages received from said network, said message control module including:
      a broadcast notification handler to generate a corresponding processor task to process a broadcast notification message received from a new network source and to provide a broadcast notification message received from said network and associated with an existing processor task to that task to facilitate processing of said received broadcast notification message;
      a network message handler to process a network message associated with a network message notification received from said network in response to determining that said associated network message can be processed within an interval prior to transmission of said pending broadcast message; and
      a network message module to facilitate transmission of an acknowledgment in response to receiving said associated network message from said network.

11. In a communications network, a communication unit to transmit and receive messages within said network comprising:
  a transmitter to transmit an outgoing message to at least one other communication unit within said network;
  a receiver to receive an incoming message from at least one other communication unit within said network; and
  a processor to control said transmission and reception of said outgoing and incoming messages, wherein said processor includes:
    a broadcast notification module to facilitate transmission of a plurality of broadcast notification messages in a particular transmission sequence to said at least one other communication unit, wherein said broadcast notification messages notify said at least one other communication unit of a pending broadcast message, and wherein each said broadcast notification message includes an identifier indicating a position of that notification message within said transmission sequence;
    a broadcast transmission module to facilitate transmission of said pending broadcast message to said at least one other communication unit subsequent to transmission of said plurality of broadcast notification messages within said transmission sequence; and
    a message control module to prioritize reception of a first broadcast message with respect to processing of other messages, said message control module including:
      a broadcast message handler to facilitate transmission of a second broadcast message and to store said second broadcast message in a storage unit for subsequent transmission in response to current processing for reception of said first broadcast message;
      a broadcast notification handler to generate a corresponding processor task to process a broadcast notification message received from a new network source and to provide a broadcast notification message received from said network and associated with an existing processor task to that task for processing of said received broadcast notification message;
      a network message handler to process a network message associated with a message notification received from said network in response to determining that said associated network message can be processed within an interval prior to reception of each broadcast message associated with a received broadcast notification message corresponding to an existing processor task; and
      a network message module to facilitate transmission of an acknowledgment in response to receiving said associated network message from said network.

12. In a communications network, a communication unit to transmit and receive messages within said network comprising:
  a transmitter to transmit an outgoing message to at least one other communication unit within said network;
  a receiver to receive an incoming message from at least one other communication unit within said network; and
  a processor to control said transmission and reception of said outgoing and incoming messages, wherein said processor includes:
    a broadcast notification module to facilitate transmission of a plurality of broadcast notification messages in a particular transmission sequence to said at least one other communication unit, wherein said broadcast notification messages notify said at least one other communication unit of a pending broadcast message, and wherein each said broadcast notification message includes an identifier indicating a position of that notification message within said transmission sequence;
    a broadcast transmission module to facilitate transmission of said pending broadcast message to said at least one other communication unit subsequent to transmission of said plurality of broadcast notification messages within said transmission sequence;

a notification reception module to facilitate reception of said broadcast notification messages and to determine a reception time for said pending broadcast message based on said identifier of each received broadcast notification message, wherein said notification reception module includes a message control module to prioritize transmission and reception of broadcast messages, and wherein said message control module includes a transmission interrupt module to interrupt transmission of a first broadcast message and store said first broadcast message in a storage unit for subsequent transmission in response to determining that a second broadcast message associated with a broadcast notification message received from said network can be received within an interval prior to transmission of said first broadcast message; and a broadcast reception module to facilitate reception of said pending broadcast message by said determined reception time.

13. In a communications network, a method of transmitting and receiving broadcast messages within said network comprising the steps of:

(a) transmitting a sequence of plural broadcast notification messages to at least one communication unit within said network prior to transmission of a pending broadcast message to notify said at least one communication unit of said pending broadcast message, wherein said broadcast notification messages within said sequence include information enabling said at least one communication unit to determine when a transference of said pending broadcast message to said at least one communication unit is to occur; and (b) transmitting said pending broadcast message to said at least one communication unit subsequent to transmission of said sequence of plural broadcast notification messages.

14. The method of claim 13 wherein said information of each said broadcast notification message includes an identifier indicating a position of that notification message within said sequence.

15. The method of claim 14 wherein step (a) further includes:

(a.1) transmitting each broadcast notification message at a particular time interval and in accordance with said position of that notification message within said sequence indicated by said identifier associated with that notification message.

16. The method of claim 13 wherein said broadcast notification and broadcast messages are transmitted in the form of radio signals.

17. The method of claim 14 further including the steps of:

(c) receiving said broadcast notification messages at said at least one communication unit and determining a reception time for said pending broadcast message based on said identifier of each received broadcast notification message; and (d) receiving said pending broadcast message at said at least one communication unit by said determined reception time.

18. The method of claim 17 wherein said broadcast notification and broadcast messages are received in the form of radio signals.

19. The method of claim 14 wherein said network includes a reservation channel for conveyance of data channel reservation information and at least one data channel for conveyance of data, and wherein step (a) further includes:

(a.1) transmitting said broadcast notification messages over said reservation channel; and step (b) further includes:

(b.1) transmitting said pending broadcast message over a data channel indicated in said transmitted broadcast notification messages.

20. The method of claim 13 wherein step (a) further includes:

(a.1) storing said pending broadcast message in a storage unit in response to transmitting or receiving another broadcast message.

21. The method of claim 13 wherein step (a) further includes:

(a.1) dynamically determining a quantity of broadcast notification messages to transmit prior to transmission of said pending broadcast message based on network parameters.

22. In a communications network, a method of transmitting and receiving broadcast messages within said network comprising the steps of:

(a) transmitting a plurality of broadcast notification messages in a particular transmission sequence to at least one communication unit within said network, wherein said broadcast notification messages notify said at least one communication unit of a pending broadcast message and each said broadcast notification message includes an identifier indicating a position of that notification message within said transmission sequence, and wherein step (a) further includes:

(a.1) prioritizing transmission of said pending broadcast message with respect to other messages received from said network, wherein step (a.1) further includes:

(a.1.1) generating a corresponding processor task to process a broadcast notification message received from a new network source and providing a broadcast notification message received from said network and associated with an existing processor task to that task to facilitate processing of said received broadcast notification message;

(a.1.2) processing a network message associated with a network message notification received from said network in response to determining that said associated network message can be processed within an interval prior to transmission of said pending broadcast message; and (a.1.3) transmitting an acknowledgment in response to receiving said associated network message from said network; and (b) transmitting said pending broadcast message to said at least one communication unit subsequent to transmission of said plurality of broadcast notification messages within said transmission sequence.

23. In a communications network, a method of transmitting and receiving broadcast messages within said network comprising the steps of:

(a) transmitting a plurality of broadcast notification messages in a particular transmission sequence to at least one communication unit within said network, wherein said broadcast notification messages notify said at least one communication unit of a pending broadcast message, and wherein each said broadcast notification message includes an identifier indicating a position of that notification message within said transmission sequence;

(b) transmitting said pending broadcast message to said at least one communication unit subsequent to transmission of said plurality of broadcast notification messages within said transmission sequence;

(c) receiving said broadcast notification messages at said at least one communication unit and determining a reception time for said pending broadcast message based on said identifier of each received broadcast notification message, wherein step (c) further includes:

(c.1) prioritizing reception of a first broadcast message with respect to processing of other messages, wherein step (c.1) further includes:

(c.1.1) facilitating transmission of a second broadcast message and storing said second broadcast message in a storage unit for subsequent transmission in response to current processing for reception of said first broadcast message;

(c.1.2) generating a corresponding processor task to process a broadcast notification message received from a new network source and providing a broadcast notification message received from said network and associated with an existing processor task to that task for processing of said received broadcast notification message;

(c.1.3) processing a network message associated with message notification received from said network in response to determining that said associated network message can be processed within an interval prior to reception of each broadcast message associated with a received broadcast notification message corresponding to an existing processor task; and (c.1.4) transmitting an acknowledgment in response to receiving said associated network message from said network; and (d) receiving said pending broadcast message at said at least one communication unit by said determined reception time.

24. In a communications network, a method of transmitting and receiving broadcast messages within said network comprising the steps of:

(a) transmitting a plurality of broadcast notification messages in particular transmission sequence to at least one communication unit within said network, wherein said broadcast notification messages notify said at least one communication unit of a pending broadcast message, and wherein each said broadcast notification message includes an identifier indicating a position of that notification message within said transmission sequence;

(b) transmitting said pending broadcast message to said at least one communication unit subsequent to transmission of said plurality of broadcast notification messages within said transmission sequence;

(c) receiving said broadcast notification messages at said at least one communication unit and determining a reception time for said pending broadcast message based on said identifier of each received broadcast notification message, wherein step (c) further includes:

(c.1) prioritizing transmission and reception of broadcast messages, wherein step (c.1) further includes:

(c.1.1) interrupting transmission of a first broadcast message and storing said first broadcast message in a storage unit for subsequent transmission in response to determining that a second broadcast message associated with a broadcast notification message received from said network can be received within an interval prior to transmission of said first broadcast message; and (d) receiving said pending broadcast message at said at least one communication unit by said determined reception time.

25. In a communications network, a communication unit to transmit and receive messages within said network comprising:

a transmitter to transmit an outgoing message to at least one other communication unit within said network;

a receiver to receive an incoming message from at least one other communication unit within said network; and a processor to control said transmission and reception of said outgoing and incoming messages, wherein said processor includes:

a notification module to facilitate transmission of a sequence of plural notification messages to said at least one other communication unit prior to transmission of a pending message to notify said at least one other communication unit of said pending message, wherein said notification messages within said sequence include information enabling said at least one other communication unit to determine when transference of said pending message to said at least one other communication unit is to occur; and a transmission module to facilitate transmission of said pending message to said at least one other communication unit subsequent to transmission of said sequence of plural notification messages.

26. The unit of claim 25 wherein said information of each said notification message includes an identifier indicating a position of that notification message within said sequence.

27. The unit of claim 25 wherein said pending message is a broadcast message.

28. The unit of claim 26 wherein said processor further includes:

a notification reception module to facilitate reception of said notification messages and to determine a reception time for said pending message based on said identifier of each received notification message; and a reception module to facilitate reception of said pending message by said determined reception time.

29. In a communications network, a method of transmitting and receiving messages comprising the steps of:

(a) transmitting a sequence of plural notification messages to at least one communication unit within said network prior to transmission of a pending message to notify said at least one communication unit of said pending message, wherein said notification messages within said sequence include information enabling said at least one communication unit to determine when transference of said pending message to said at least one other communication unit is to occur; and (b) transmitting said pending message to said at least one communication unit subsequent to transmission of said sequence of plural notification messages.

30. The method of claim 29 wherein said information of each said notification message includes an identifier indicating a position of that notification message within said sequence.

31. The method of claim 29 wherein said pending message is a broadcast message.

32. The method of claim 30 farther including the steps of:

(c) receiving said notification messages at said at least one communication unit and determining a reception time for said pending message based on said identifier of each received notification message; and (d) receiving at said at least one communication unit said pending message by said determined reception time.

* * * * *